C. CRETORS.
CHARGING MECHANISM FOR CORN POPPING APPARATUS.
APPLICATION FILED MAR. 31, 1917.

1,279,517.

Patented Sept. 24, 1918.
5 SHEETS—SHEET 1.

Inventor:
Charles Cretors,
by
Robert Burns.
Atty.

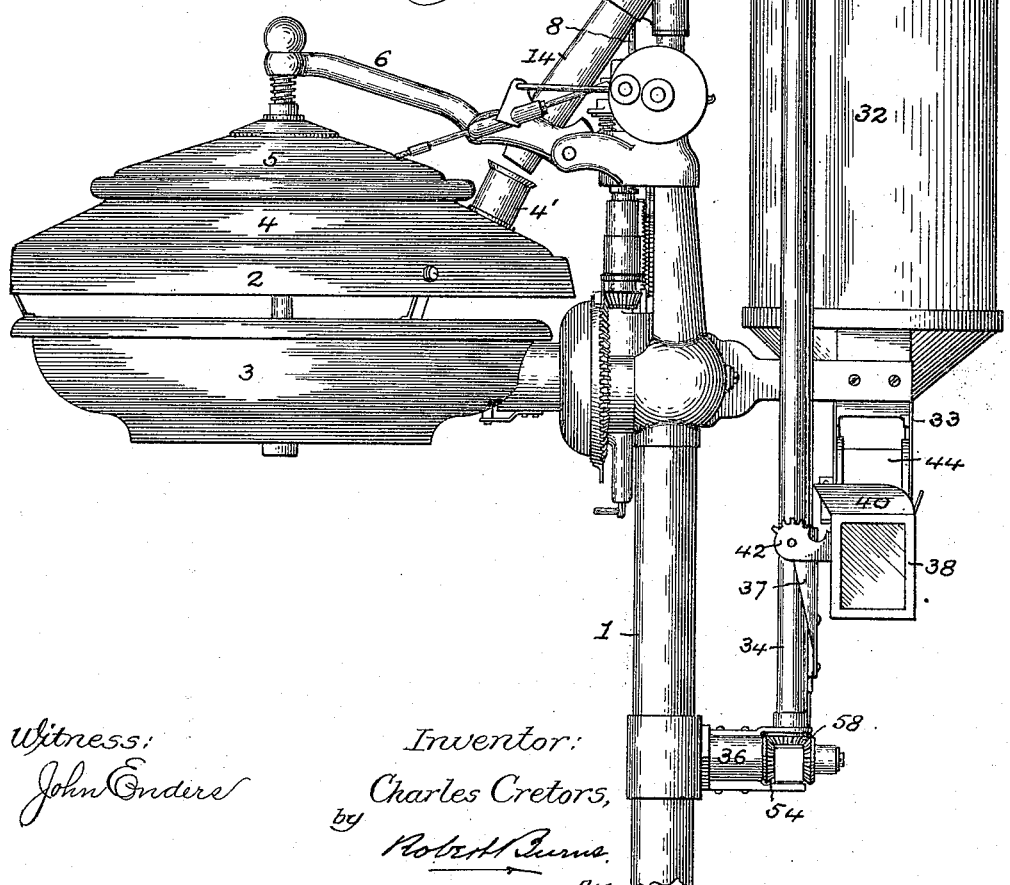

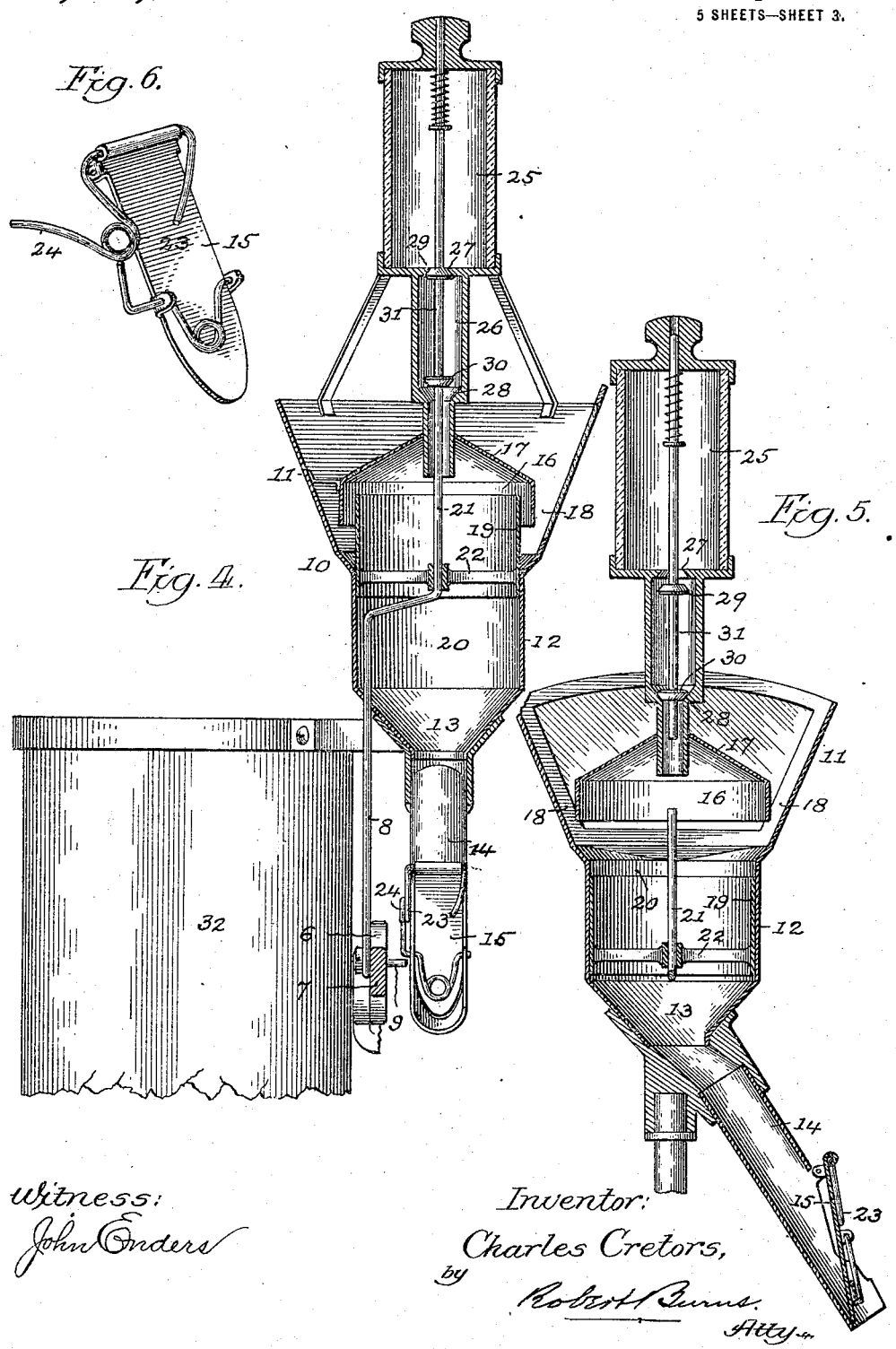

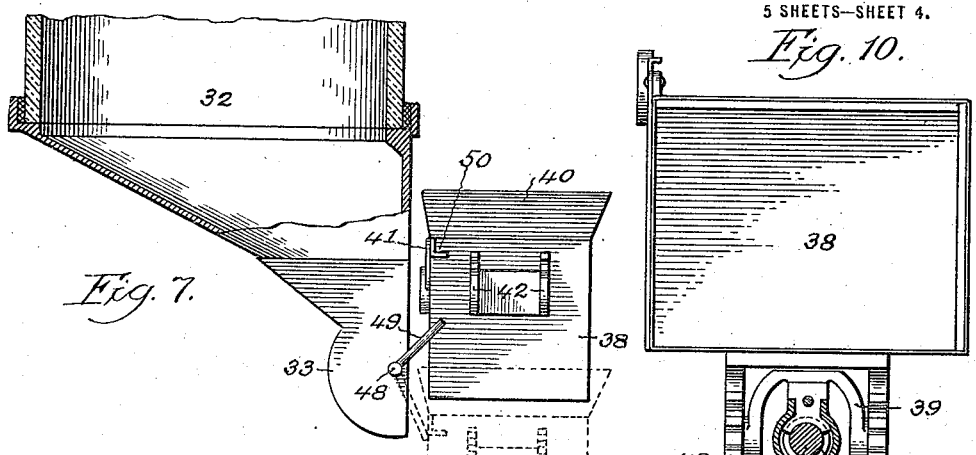
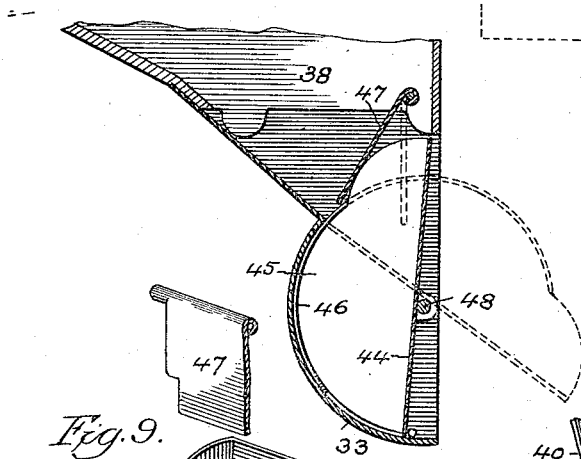
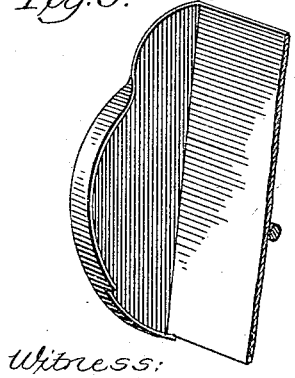
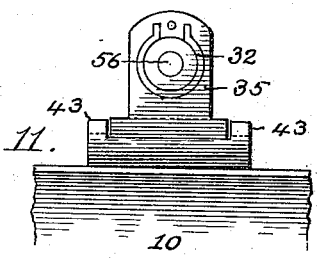
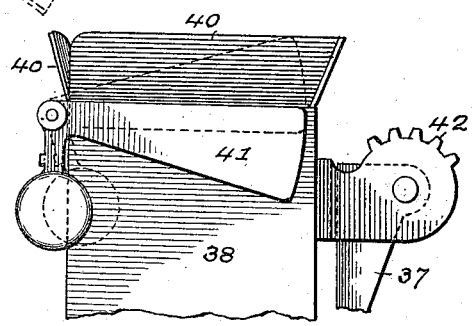

C. CRETORS.
CHARGING MECHANISM FOR CORN POPPING APPARATUS.
APPLICATION FILED MAR. 31, 1917.
1,279,517.
Patented Sept. 24, 1918.
5 SHEETS—SHEET 5.
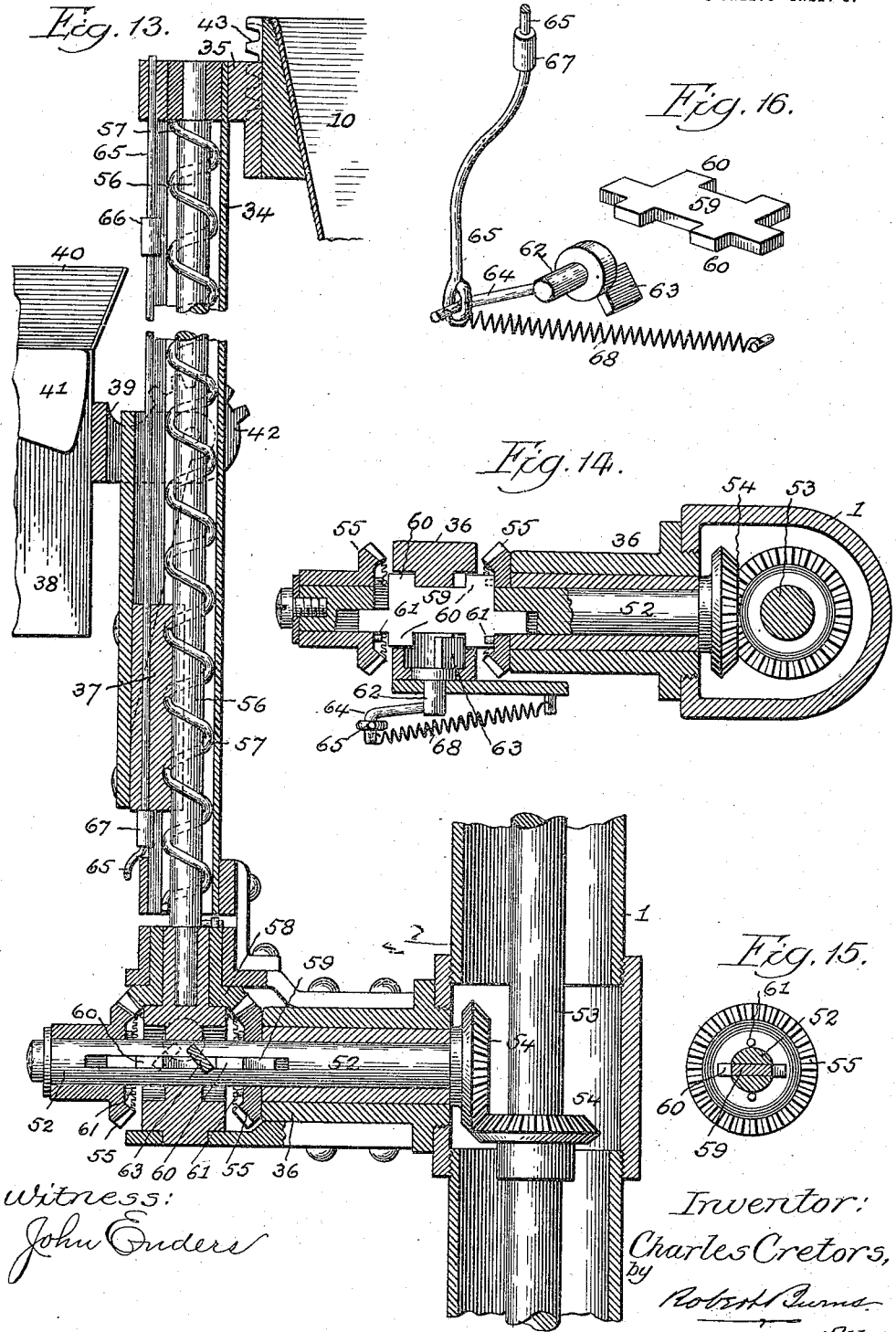

UNITED STATES PATENT OFFICE.

CHARLES CRETORS, OF CHICAGO, ILLINOIS.

CHARGING MECHANISM FOR CORN-POPPING APPARATUS.

1,279,517.

Specification of Letters Patent.   Patented Sept. 24, 1918.

Application filed March 31, 1917.   Serial No. 158,930.

*To all whom it may concern:*

Be it known that I, CHARLES CRETORS, a citizen of the United States of America, and a resident of Chicago, in the county of Cook, State of Illinois, have invented certain new and useful Improvements in Charging Mechanism for Corn-Popping Apparatus, of which the following is a specification.

This invention relates to the type of corn popping apparatus shown and claimed in my prior Patent No. 1,201,807, dated October 17, 1916, and also in my application for patent Serial No. 141,095, filed January 8, 1917. And the present improvement has for its various objects:

To provide in connection with the intermittently revoluble popping pan and its accessories of the aforesaid patented apparatus, an interconnected and automatically actuated measuring and charging means, wherewith a charge of raw or unpopped corn is periodically introduced in the popping pan at a period in the operation of the apparatus at which the popping pan and accessories nears the end of an intermittent semi-revolution to its normal righted position for a succeeding popping operation.

To provide in connection with the above mentioned measuring and charging means, an interconnected and automatically controlled supply means, whereby the containing hopper of said measuring and charging means is intermittently supplied with raw or unpopped corn, and the proper supply or quantity insured in said containing chamber, previous to a succeeding automatic operation of the measuring and charging means.

To provide in connection with the aforesaid measuring and charging means, a secondary interconnected and automatically actuated measuring and charging means, wherewith a charge of salt or like condiment is introduced into the charge of raw or unpopped corn before the same is delivered to the popping pan of the apparatus.

To provide simple and efficient structural formations and associations of the intermediate means and mechanisms of the apparatus, whereby the automatic and periodic operation of the parts is attained in a positive and effective manner. All as will hereinafter more fully appear.

In the accompanying drawings:

Fig. 2, is a companion front elevation.

Fig. 3, is a top view.

Fig. 4, is a detail vertical section of the measuring and charging means, with the upper valve or gate thereof shown in a raised position.

Fig. 5, is a transverse sectional elevation of the same, with the said upper valve or gate shown in its lowered position.

Fig. 6, is a detail perspective view of the lower gate or valve controlling the outflow from said measuring and charging means.

Fig. 7, is a detail end elevation, with parts in section, of the lower and outlet end of the supply bin, the associated elevator bucket and accessories.

Fig. 8, is a vertical section of the lower portion of the supply bin and its pivoted gate or valve and accessories.

Fig. 9, is a detail and detached perspective view of the pivoted gate and auxiliary gate controlling the outlet end of the supply bin.

Fig. 10, is a detail plan view of the elevator bucket, carrying track and accessories, parts being shown in horizontal section.

Fig. 11, is a detail plan, showing the connection of the carrying track to the hopper of the measuring and charging means.

Fig. 12, is a detail rear elevation of the upper portion of the elevator bucket and its accessories.

Fig. 13, is an enlarged detail axial section of the vertical track, and automatic reversible operating mechanism, by which the elevator bucket is raised and lowered.

Fig. 14, is a detail horizontal section of the same.

Fig. 15, is a detail transverse section of the horizontal shaft, associated clutch head and a bevel gear of the operating mechanism for raising and lowering the elevator bucket.

Fig. 16, is a detail and detached perspective view of the sliding clutch head and its operating accessories.

Similar reference numerals indicate like parts in the several views.

Figure 1:
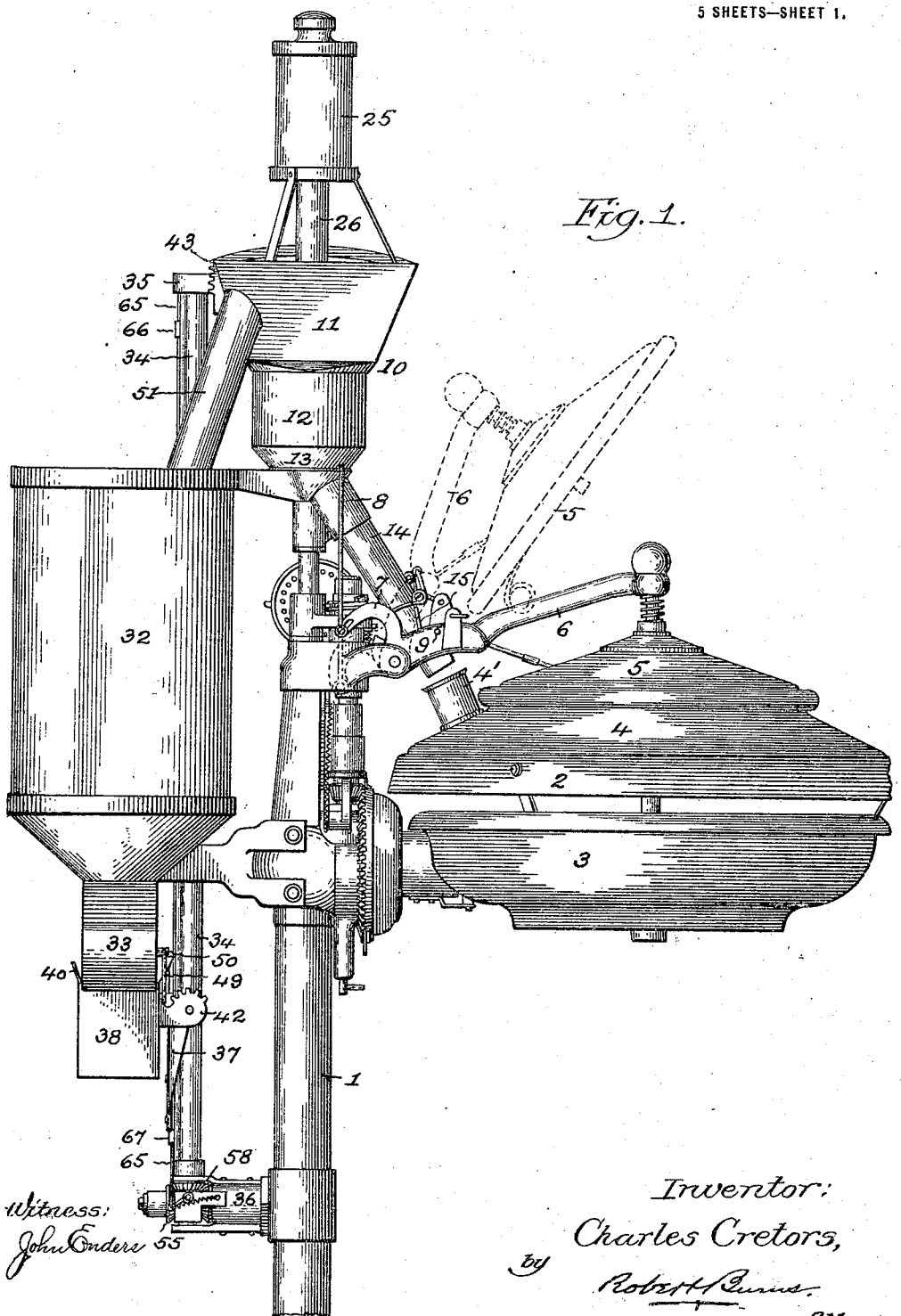
Figure 1, is a rear elevation, illustrating the general arrangement of parts in the present improvement, and the association thereof with a corn popping apparatus similar to that of my prior Patent No. 1,201,807 aforesaid.

Referring to the drawings, 1 designates the upright tubular post constituting the supporting means of the apparatus, and having a horizontal bracket tube upon which is revolubly mounted the popping pan 2 and its fixedly associated fuel gas burner 3, and which receive intermittent semi-revolutions through operating and timing mechanisms, such as described in detail in my aforesaid prior Patent No. 1,201,807, and application for patent Serial No. 145,095.

4 designates the fixed top member or hood of the popping pan, of a truncated cone form and having a central top opening for the discharge of the popped corn. In the present improvement the hood 4 is provided with a laterally disposed inlet neck 4' for the introduction of a supply of raw or unpopped corn into the popping pan 2 aforesaid.

5 designates the pan cover, usually of a flat cone form and adapted to close the central top opening of the fixed pan hood 4 aforesaid. The pan cover 5 is pivotally mounted on the upper portion of the upright post 1, by means of a carrying arm 6, which in turn has automatic and periodic operative connection with the driving and controlling mechanisms of the apparatus, as described in detail in my patent and application aforesaid.

7 designates a crank arm or extension on the cover carrying arm 6, aforesaid, adjacent to the pivot axis thereof, and having operative connection by a vertical operating rod 8 with the upper gate or valve of the measuring means, hereinafter described in detail.

9 designates an operating stud or pin moving with the aforesaid cover carrying arm 6, and adapted for operative engagement with the outlet gate or valve of the measuring means, as hereinafter described.

10 designates a casing or hopper supported on the upper end of the upright post 1, and preferably consisting of a flaring open top upper portion 11, and intermediate cylindrical portion 12, and a funnel shaped bottom portion 13, as shown more particularly in Figs. 4 and 5.

14 designates an inclined chute extending from the bottom portion 13 of the casing 10, to the aforesaid inlet neck 4' of the pan hood 4, and adapted to discharge the supply of corn through said neck and into the popping pan. At its outlet end said chute 14 is provided with a controlling gate or valve 15 preferably of the spring held type hereinafter described.

16 designates a hollow deflecting shell, open at bottom and closed at its upper end by a conical head 17, and fixed centrally in the flaring top portion of the hopper casing 10, and adapted to house the upper end of the hereinafter described movable upper gate or valve of the measuring mechanism. The shell 16 in conection with the wall of the hopper 10 forms an annular containing chamber or passage 18, communication between which, and the under disposed chamber of the intermediate portion 12 of the hopper 10, is controlled by an upper vertically moving gate or valve 19, preferably of the following structural formation:—

19 designates the movable gate above referred to, preferably of a shell form, open top and bottom, and adapted to fit and slide vertically in the intermediate cylindrical portion 12 of the hopper 10 aforesaid. With said gate or valve 19 in the elevated position shown in Fig. 4, its upper portion projects into the interior of the deflecting shell 16, aforesaid, and prevents a flow of the corn from the annular chamber 18 into the lower and the measuring chamber 20, formed by the intermediate portion 12 and bottom 13 of the hopper 10, aforesaid. With the gate or valve 19 in the lowered position shown in Fig. 5, there is a free communication between the annular chamber 18 and the measuring chamber 20, so that the corn may flow freely into the last mentioned chamber 20 until the same is completely filled.

21 designates a central operating rod or stem fixedly connected to the gate or valve 19 by a spider 22, and connected directly to the operating rod 8, aforesaid, and constituting an operative extension thereof. The arrangement of parts is such that as the pan cover 5 moves into its lowered position shown in full lines in Figs. 1 and 2, the gate or valve 19 will assume its elevated position shown in Fig. 4, while with the pan cover 5 in raised position shown in dotted lines in Fig. 1, the gate or valve 19 will assume the lowered position shown in Fig. 5.

The swinging gate or valve 15 heretofore referred to, is pivoted at one end to the inclined chute 14 aforesaid, and is adapted to normally close the lower and open end of said chute, which is preferably of the oblique open form shown more particularly in Fig. 5, with a correspondingly oblique arrangement of the swinging gate or valve 15 aforesaid.

23 designates a spring member associated with the swinging gate 15 and chute 14 aforesaid, and tending to hold said gate 15 in a closed condition. In the preferred construction shown, the spring member 23 is provided with an extension or arm 24, which projects into the path of the operating stud or pin 9 on the cover carrying arm 6 of the apparatus, so as to be operated thereby and cause an opening of the valve 15 at the proper period in the operation of the apparatus. And the arrangement of parts is such that as the pan cover 5 moves into its lower position, shown in full lines in Figs. 1 and 2, the gate 15 will be moved into its open position to permit a flow of corn into the popping pan from the measuring chamber 20. Such opening of the valve 15 taking place immediately after the valve 19 has been moved into the elevated position above described. With the pan cover 5 in the raised position shown in dotted lines in Fig. 1, the valve 15 will be released from operative engagement with stud or pin 9 aforesaid, and will assume its closed position under the influence of the spring member 23, to close the lower end of the chute 14.

25 designates a chamber or casing for containing a supply of common salt, or like granular condiment, and communicating at its lower end with an under disposed measuring chamber 26, the casing or housing of which is supportingly attached to the conical head 17 of the deflecting shell 16 aforesaid, and opens therethrough, as shown more particularly in Figs. 4 and 5.

27 and 28 designate vertically alined valve openings at the top and bottom of the measuring chamber 26 aforesaid, and 29 and 30 designate movable valve heads individual to the valve openings 27, 28, and connected together in vertical alinement by a connecting rod or stem 31, common to both heads, and which rod or stem in turn is in vertical alinement with the stem 21 of the valve or gate 19 aforesaid, and adapted for operation thereby. The valve heads 29, 30, are so positioned in relation to each other and to the valve openings 27, 28, that when one valve head is in closing engagement with its valve opening, the other valve head will be removed from its valve opening, and vice versa. And the arrangement of the parts is such that with the valve heads 29, 30, in the lowered position shown in Fig. 5, the chambers 25 and 26 will be in communication and the salt will flow into and fill the lower and measuring chamber 26. With the valve heads 29, 30, in the raised position shown in Fig. 4, communication between the chambers 25 and 26, is closed, and the lower valve opening 28, is in an open condition, to permit of the discharge from the measuring chamber 26, of the contained quantity of salt down onto the raw corn, within the holding hopper 10 before described.

32 designates a supply bin adapted to contain a supply of raw or unpopped corn for use during the continued use of the apparatus. Said bin 32 is of an open top form, and has at its lower end a conical bottom ending in a vertically faced and laterally disposed semi-cylindrical outlet trunk 33, containing a semi-rotary gate or valve and accessories hereinafter described in detail.

34 designates a vertically disposed guideway or track, preferably of the slotted tubular form shown, arranged in adjacent relation to the supply bin 32 and measuring hopper 10, and secured at its upper end to the hopper 10 by a lateral bracket member 35, and at its lower end to the fixed post 1, by a hollow horizontal bracket member 36.

37 designates a head or carriage having sliding connection with the track 34, and adapted to receive vertical reciprocation through the operating means, hereinafter described.

38 designates an elevator bucket pivotally attached by bracket arms 39 to the head or carriage 37, so as to be capable of the tipping or dumping movement hereinafter described. The elevator bucket 38 is of the open top rectangular form shown, and is so positioned that one of its vertical walls will have movement in close relation to the before mentioned vertical face of the outlet trunk 33 aforesaid, with the top edge of said wall of the bucket on a plane adjacent to that of the lower edge of the trunk 33, when said elevator bucket is in its fully lowered position, shown in full lines in Fig. 2, and in dotted lines in Fig. 7.

40 designates outwardly inclined plates or flanges at the upper ends of three of the walls of the elevator bucket 38, adapted to prevent a side-spill of the corn from the said bucket during its filling discharging and traveling movements.

41 designates a companion gravity plate or shield, pivotally arranged at the upper end of the wall of the elevator bucket 38 next adjacent to the outlet trunk 33 of the supply bin 32. Normally the upper edge of the plate or shield 41 is on a level with said bucket wall, and is adapted to swing upward by gravity to prevent a lateral spill of the corn, as the elevator bucket 38 tilts from its normal vertical condition in the operation of discharging the contents of the bucket into the measuring hopper 10 aforesaid, as illustrated in dotted lines in Figs. 2 and 12.

42 designates a toothed sector fixed to the side of the elevator bucket 38, and adapted for operative engagement with a fixed vertical toothed rack 43 in the side of the measuring hopper 10, so that as the said bucket is finishing its upward travel, a tilting or dumping motion will be imparted to the bucket by an operative engagement between said sector and rack, as illustrated more particularly in Fig. 2.

44 designates a gate or valve, of a plate form and provided with semi-circular side wings 45. Said gate or valve 44 is pivoted at its mid-length in the outlet trunk 33 of the supply bin 32 aforesaid, and its side wings 45 are formed with inturned curved flanges 46 adapted to support and control the auxiliary gate or valve 47 now to be described.

47 designates the auxiliary gate or valve above referred to, of a plate form and pivoted at its upper end in the side walls of the outlet trunk 33 aforesaid, with its lower end normally resting on the inturned flanges 46 of the gate or valve 44. And the arrangement of parts is such that with the gate or valve 44 in its closed condition, the auxiliary gate or valve 47 will be moved into adjacent relation to the inclined bottom of the supply bin 32, as shown in full lines in Fig. 8, and be adapted to receive the stress of the superimposed mass of corn, and in a great measure relieve the gate or valve 44 from said stress in the movement of said gate or valve to an open condition. With an opening of said gate or valve 44, the auxiliary gate or valve 47 moves out of engagement with the curved flanges 46 of the gate or valve 44, so as not to impede the flow of corn into the adjacent elevator bucket 38, as illustrated in dotted lines in Fig. 8.

48 designates the pivot shaft of the gate or valve 44 aforesaid, passing transversely through the side walls of the outlet trunk 33 aforesaid, and provided at one end with an operating arm 49 adapted for operative engagement by a lug or projection 50 on the elevator bucket 38. The arrangement of parts is such that as the elevator bucket nears the end of its downward travel, the gate or valve 44 will be opened to permit a flow of corn into said bucket, and with the initial upward travel of said elevator bucket, said gate or valve 44 will be pushed to its closed position by the top margin of the elevator bucket 38, to effect a stoppage of the flow of corn.

51 designates a tube or spout connecting the upper end of the hopper 10 with the supply bin 32, and adapted to return to said bin any excess quantity of corn placed in said hopper, in the periodic supply operation of the elevator bucket 38, aforesaid.

The means shown in the drawings for effecting the alternate ascent and descent of the elevator bucket 38, comprises as follows:

52 designates a horizontal shaft journaled in the hollow bracket 36 of the post 1 of the apparatus, and operatively connected at one end to the main shaft 53 of the apparatus by a pair of bevel gears 54. At the other end the shaft 52 carries a pair of bevel gears 55, mounted loosely on said shaft 52, in spaced relation to each other, and adapted to be alternately clutched to the shaft 52 by the automatic clutch mechanism hereinafter described in detail.

56 designates a vertical shaft, preferably arranged within the tubular track or slideway 34 aforesaid, and provided with a spiral thread or worm 57 on its surface, as shown more particularly in Fig. 13, adapted for operative engagement in a complementary worm formation in the adjacent vertical face of the head or carriage 37 of the elevator bucket 38 aforesaid. The said shaft 56 is adapted to receive alternate rotation in opposite directions, so as to impart the required upward and downward travel to the elevator bucket 38 in the continued operation of the apparatus. And to such end the shaft 56 is provided at its lower end with a bevel gear wheel 58 meshing with the pair of bevel gear wheels 55 above described.

59 designates a movable clutch head rotating with and capable of limited independent sliding movement in a slot or way formed in the horizontal shaft 52 aforesaid. Said head 59 is arranged intermediate of the pair of bevel gear wheels 55, and its respective ends are provided with clutch projections 60 adapted for alternate engagement with corresponding clutch projections or pins 61 on the respective bevel gear wheels 55, so as to clutch together the shaft 52, clutch head 59, and one or the other of the bevel gear wheels 55, to rotate in unison.

62 designates a semi-rotary shipper shaft or spindle journaled in the tubular bracket member 36 aforesaid, and having at its inner end an arm 63 for operative engagement with the clutch head 59, and adapted to shift the same into clutching engagement with one or the other of the bevel gear wheels 55 aforesaid. At its outer end the shipper shaft 62 is provided with an operating arm 64 arranged in an approximately horizontal plane, and adapted in its movements to move to points above and below a horizontal line drawn through its pivot axis.

65 designates a vertical tappet shaft or rod arranged to slide in parallel relation to the vertical worm shaft 56 aforesaid, and connected at its lower end to the operating arm 64 of the shipper shaft 62 as shown. Intermediate of its height said tappet shaft 65 carries a pair of tappet collars 66, 67 in vertically spaced relation and adapted for alternate engagement with the upper and lower ends of the carriage 37 of the elevator bucket 38, as said carriage nears the end of its upward and its downward travels in the continued operation of the mechanism. The arrangement of parts is such, that as the carriage 37, nears the end of either its upward or its downward travel, the tappet shaft 65 will be automatically operated to cause a corresponding reversal of the direction in which the worm shaft 56 is rotatively driven.

68 designates a tension spring having an approximately parallel arrangement to the operating arm 64 of the shipper shaft 62 aforesaid, and attached at one end to the outer end of the arm 64, and at its other end to a fixed part of the hollow bracket 36 aforesaid. With the described arrangement the operating arm 64 is moved in a positive manner by the tappet shaft 65, a little beyond the horizontal line, and then carried entirely over by the tension of the spring 68, and regardless of whether said operating arm 64 is moving in one direction or the other.

While the form of spring impelled reversing means, above described, is preferred for attaining the required reversal of the direction of rotation of the worm shaft 56, of the elevator bucket operating mechanism, it is within the scope of this part of the present invention to substitute therefor any other well known and suitable type of reversing mechanism.

Having thus fully described my said invention, what I claim as new and desire to secure by Letters Patent, is:—

1. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator adapted to convey periodic supplies of corn from the supply bin to the supply hopper, and operative connections between said elevator and the operating means of the popping pan, substantially as set forth.

2. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator adapted to convey periodic supplies of corn from the supply bin to the supply hopper operative connections between said elevator and the operating means of the popping pan, and a return spout connecting the upper end of the supply hopper to the supply bin, substantially as set forth.

3. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator adapted to convey periodic supplies of corn from the supply bin to the supply hopper, operative connections between said elevator and the operating means of the popping pan, and a condiment containing and charging means associated with said supply hopper and operatively connected with the charging means associated with said supply hopper, substantially as set forth.

4. In a corn popping apparatus, a revolubly mounted popping pan and heating accessories, means for imparting intermittent semi-revolutions to the same, a supply hopper associated with said popping pan, a charging means arranged within said hopper and comprising an upper deflector shell, a cylindrical chamber beneath said shell and an annular valve moving in said cylindrical chamber, a valve controlling the outlet from said cylindrical chamber, and operative connections between said valves and the operating means of the popping pan, substantially as set forth.

5. In a corn popping apparatus, a revolubly mounted popping pan and heating accessories, means for imparting intermittent semi-revolutions to the same, a supply hopper associated with said popping pan, a charging means arranged within said hopper and comprising an upper deflector shell, a cylindrical chamber beneath said shell and an annular valve moving in said cylindrical chamber, a valve controlling the outlet from said cylindrical chamber, operative connections between said valves and the operating means of the popping pan, a supply bin, an elevator adapted to convey periodic supplies of corn from the supply bin to the supply hopper, and operative connections between said elevator and the operating means of the popping pan, substantially as set forth.

6. In a corn popping apparatus, a revolubly mounted popping pan and heating accessories, means for imparting intermittent semi-revolutions to the same, a supply hopper associated with said popping pan, a charging means arranged within said hopper and comprising an upper deflector shell, a cylindrical chamber beneath said shell and an annular valve moving in said cylindrical chamber, a valve controlling the outlet from said cylindrical chamber, operative connections between said valves and the operating means of the popping pan, a supply bin, an elevator adapted to convey periodic supplies of corn from the supply bin to the supply hopper, operative connections between said elevator and the operating means of the popping pan, and a return spout connecting the upper end of the supply hopper to the supply bin, substantially as set forth.

7. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a condiment containing and charging means associated with said supply hopper and comprising an upper containing chamber, a lower measuring chamber having communication by valve openings with said upper chamber and with the charging hopper aforesaid, and a vertically moving valve controlling said valve openings and operatively connected with the charging means associated with the aforesaid charging hopper, substantially as set forth.

8. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a condiment containing and charging means associated with said supply hopper and comprising an upper containing chamber, a lower measuring chamber having communication by valve openings with said upper chamber and with the supply hopper aforesaid, and a vertically moving valve controlling said valve openings and operatively connected with the charging means associated with the aforesaid supply hopper, a supply bin, an elevator adapted to convey periodic supplies of corn from the bin to the aforesaid supply hopper, and operative connections between said elevator and the operating means of the popping pan, substantially as set forth.

9. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator bucket, means for guiding said bucket vertically between the supply bin and the supply hopper aforesaid, and means interconnected with the operating means of the popping pan for imparting up and down travel to said bucket, substantially as set forth.

10. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator bucket, means for guiding said bucket vertically between the supply bin and the supply hopper aforesaid, means for imparting a tilting movement to the bucket as it nears the end of its up travel, and means interconnected with the operating means of the popping pan for imparting up and down travel to said bucket, substantially as set forth.

11. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin having an outlet, a gate closing said outlet, an elevator bucket having operative engagement with said gate to open and close the same, means for guiding said bucket vertically between the supply bin and the supply hopper aforesaid, and means interconnected with the operating means of the popping pan for imparting up and down travel to said bucket, substantially as set forth.

12. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin having an outlet, a main and an auxiliary gate operatively associated together and adapted to control the said outlet, an elevator bucket having operative engagement with said gates to open and close the same, means for guiding said bucket vertically between the supply bin and the supply hopper aforesaid, and means interconnected with the operating means of the popping pan for imparting up and down travel to said bucket, substantially as set forth.

13. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator bucket, means for guiding said bucket vertically between the supply bin and the supply hopper aforesaid, and means interconnected with the operating means of the popping pan for imparting up and down travel to said bucket, the same comprising a worm shaft, a drive shaft, gearing connections between said shafts, and a reversing clutch mechanism adapted for automatic operation by the elevator bucket in its up and down travel, substantially as set forth.

14. In a corn popping apparatus, a revolubly mounted popping pan and heating accessories, means for imparting intermittent semi-revolutions to the same, a supply hopper associated with said popping pan, a charging means associated with said hopper and operatively connected to the operating means of the popping pan, a supply bin, an elevator bucket, means for guiding said bucket vertically between the supply bin and the supply hopper aforesaid, a gravity plate pivoted to the side of the bucket next adjacent to the supply bin, means for imparting a tilting movement to the bucket as it nears the end of its up travel, and means interconnected with the operating means of the popping pan for imparting up and down travel to said bucket, substantially as set forth.

15. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, and a charging means associated with said hopper and operatively connected to the carrying arm of the pan cover, substantially as set forth.

16. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, a supply bin, an elevator adapted to convey periodic supplies of corn from the supply bin to the supply hopper, and operative connections between said elevator and the operating means of the popping pan, substantially as set forth.

17. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, and a condiment containing and charging means associated with said supply hopper and operatively connected with the charging means associated with said supply hopper, substantially as set forth.

18. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means arranged within said hopper and comprising an upper deflector shell, a cylindrical chamber beneath said shell and an annular valve moving in said cylindrical chamber, a valve controlling the outlet from said cylindrical chamber, and operative connections between said valves and the carrying arm of the pan cover, substantially as set forth.

19. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, a condiment containing and charging means associated with said supply hopper and comprising an upper containing chamber, a lower measuring chamber having communication by valve openings with said upper chamber and with the charging hopper aforesaid, and vertically moving valves controlling said valve openings and operatively connected with the charging means associated with the aforesaid supply hopper, substantially as set forth.

20. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, a supply bin, an elevator bucket, means for guiding said bucket vertically between the supply bin and the supply hopper aforesaid, and means interconnected with the operating means of the popping pan for imparting up and down travel to said bucket, substantially as set forth.

21. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, a supply bin, an elevator bucket, means for guiding said bucket vertically between the supply bin and the supply hopper aforesaid, means for imparting a tilting movement to the bucket as it nears the end of its up travel, and means interconnected with the operating means of the popping pan for imparting up and down travel to said bucket, substantially as set forth.

22. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, a supply bin having an outlet, a main and an auxiliary gate operatively associated together and adapted to control the said outlet, an elevator bucket having operative engagement with said gates to open and close the same, means for guiding said bucket vertically between the supply bin and the supply hopper aforesaid, and means interconnected with the operating means of the popping pan for imparting up and down travel to said bucket, substantially as set forth.

23. In a corn popping apparatus, a revolubly mounted popping pan and heating accessories, means for imparting intermittent semi-revolutions to the same, a movable cover for said pan, a pivoted carrying arm for said cover, a supply hopper associated with said popping pan, a charging means associated with said hopper and operatively connected to the carrying arm of the pan cover, a supply bin, an elevator bucket, means for guiding said bucket vertically between the supply bin and supply hopper aforesaid, and means interconnected with the operating means of the popping pan for imparting up and down travel to said bucket, the same comprising a worm shaft, a drive shaft, gearing connections between said shafts, and a reversing clutch mechanism adapted for automatic operation by the elevator bucket in its up and down travel, substantially as set forth.

Signed at Pasadena, Cal., this 20th day of March, 1917.

CHARLES CRETORS.

Copies of this patent may be obtained for five cents each, by addressing the "Commissioner of Patents, Washington, D. C."